Feb. 9, 1943.  C. E. JOHNSON, JR  2,310,639
BUSHING TOOL
Filed Feb. 11, 1941
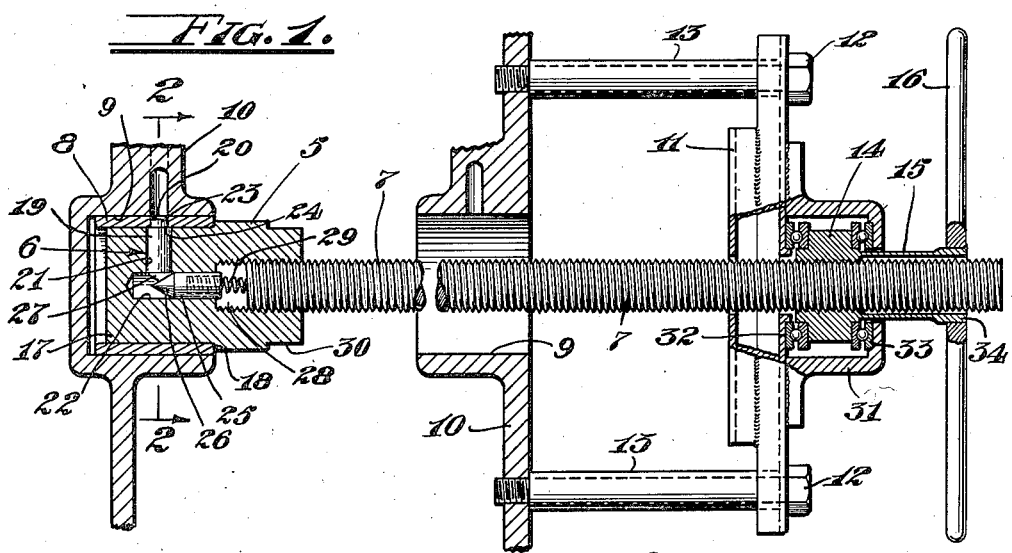
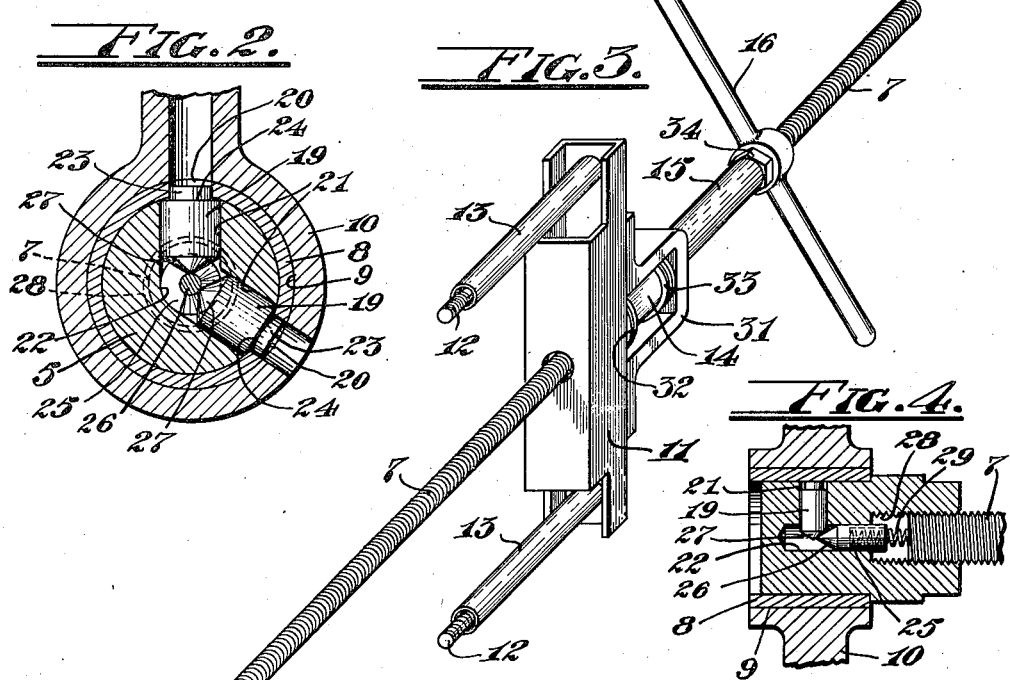
Inventor
Charles E. Johnson Jr.
By Jesse ...
Attorney Patented Feb. 9, 1943

2,310,639

UNITED STATES PATENT OFFICE 2,310,639

BUSHING TOOL

Charles E. Johnson, Jr., Phoenix, Ariz.

Application February 11, 1941, Serial No. 378,431

4 Claims. (Cl. 29—88.2)

This invention has for its primary object the provision of a new and efficient tool for facilitating an accurate installation and ready removal of plain or sleeve bushings with respect to inaccessible bores therefor without damage to the parts, and with a saving in time and labor, as for example in the cam shaft bearings of certain Diesel and other types of internal combustion engines.

Another object of my invention is to provide a bushing tool of the character described wherein a bushing gripping plug is adapted to be quickly and easily inserted into, removed from, rotated in, and releasably locked to a bushing, through the medium of a shaft on which the plug is supported so as to permit of relative axial movement thereof, and a plug carried locking means which operates responsive to predetermined movement of the shaft relative to the plug when the plug is disposed in a predetermined position in the bushing.

A further object of my invention is to provide a bushing tool such as described in which a bushing may be readily removed or installed with precision, responsive to a shaft-effected push or pull of the bushing gripping plug, by reason of the use of a novel and efficient screw threaded feeding means for axially moving the plug and also axially moving the shaft for the purpose of actuating the locking or gripping means.

An additional object of my invention is to provide a bushing tool of the character described in which the means for gripping the bushing and locking it to the plug takes advantage of the presence of the oil openings in the bushing for effecting a positive lock-up of the bushing and plug, there being one or more locking pins carried by the plug which are extended into said openings responsive to axial movement of the shaft relative to said plug, whereby slipping of the bushing relative to the plug is positively prevented and the installation and removal operations are therefore greatly facilitated.

Yet another object is to provide a tool of the character described a novel intermediate operating means in the plug between the shaft and the extensible locking pins, which means responds to a thrust of the shaft for extending the pins and may if desired include a spring which may be compressed by the thrust of the shaft so that when the locking pins come into registry with the oil openings in the bushing the pins will be moved into said openings without further manipulation of the shaft and thus render easier the registry of the pins with the oil openings and the locking of the tool to the bushing.

Yet another object of my invention is to provide a tool such as described wherein the shaft for manipulating the plug and locking means is subject to being readily grasped and manually rotated to advance the shaft in the plug and operate the locking means, in one instance, and to turn the plug for aligning the locking pin with the oil openings in the bushing in another instance, and for turning the bushing to align said oil openings with the oil ports which open into the bore for the bushing in another instance.

With the foregoing objects in view together with such other objects and advantages as may subsequently appear, the invention is carried into effect as illustrated by way of example in the accompanying drawing in which:

Fig. 1 is a fragmentary sectional view of a bushing tool embodying my invention and shown as when employed for installing or removing a bushing of an engine of which bearing portions are shown;

Fig. 2 is an enlarged sectional view taken on the line 2—2 of Fig. 1;

Fig. 3 is a perspective view of my improved bushing tool;

Fig. 4 is a sectional view of the bushing gripping plug and lock means as when the spring of said means is compressed for extending the locking pins when the latter come into registry with the oil openings in the bushing, said pins being out of such registry in said figure and held against extension by contact with the imperforate wall of the bushing.

Referring to the drawing more specifically, the bushing tool there shown as illustrative of one embodiment of my invention generally includes a bushing gripping plug 5, a bushing gripping and locking means 6 carried by the plug, a screw threaded plug supporting shaft 7 for manipulating the plug and locking means relative to a bushing such as the one 8 in a bore 9 of an engine structure or block 10 as shown in Fig. 1, a shaft supporting cross head 11 adapted to be mounted on the structure or block 10 by means of bolts 12 and spacers 13; a rotary feed nut 14 carried by the cross head for extending and retracting the shaft, a tubular drive shaft 15 for the nut, and a wrench or handle 16 for rotating said drive shaft. These tool parts make up as a small compact unit as particularly shown in Fig. 3, and which is ready for application to an engine structure as shown in Fig. 1, for the purpose of installing or removing bushings.

As here provided the plug 5 has a reduced end portion 17 adapted to have a close fit in the bushing and which defines an annular stop shoulder 18 to limit the extension of the plug to position registering the locking pins 19 with the plane of the oil openings 20 in the bushing. These pins are mounted in radial bores 21 in the plug and said bores open into an axial bore 22 in which is mounted a means for communicating the thrust of the shaft 7 to and extending the pins. In this connection it should be noted the pins have reduced outer ends 23 defining stop shoulders 24 to limit the extension of the pins to position spaced somewhat inwardly from the outer ends of the oil openings 20 as shown in Figs. 1 and 2.

The means for extending the locking pins may comprise an axially movable thrust pin 25 having a tapered or conical end 26 for contact with the tapered ends 27 of the locking pins so as to extend them with a cam action. The axial bore 22 in which the thrust pin 25 is slidable, opens into a screw threaded bore 28 in which the shaft 7 is threadedly engaged and movable for sliding said pin. I may, as here shown use a spring 29 between the shaft 7 and thrust pin so that the spring will be compressed responsive to the thrust of the shaft 7 and thereby move the thrust pin for extending the locking pins, provided the latter are in registry with the oil openings in the bushing. If however, the locking pins are out of registry as seen in Fig. 4, the spring if compressed will move the thrust pin to extend the locking pins once the latter register with the oil openings in the bushing. It is obvious however that the spring may be dispensed with and the end of the shaft 7 depended on to contact and move the thrust pin.

It should be noted that the shaft connected end of the plug 5 is reduced as at 30 for extension into a bushing which may be removed by pulling on the plug.

The cross head 11 carries a U-shaped strap 31 for supporting the nut 14 for free rotation between ball-bearings 32 and 33 so that the shaft 7 will be axially moved responsive to such rotation of the nut.

A tubular drive shaft 15 is fixed to the nut, telescopes the shaft 7 and provided with a hexagonal outer end 34 for reception of the wrench or handle 16 by means of which the shaft 15 and the nut are rotated to move the shaft axially.

It should be noted that the bolts 12 and spaces 13 are of such length as to space the cross head well outwardly from the engine structure or block 10 whereby the portion of the shaft 7 between said structure and the cross head is accessible for manual rotation of said shaft when such manipulation is necessary, and adequate working space is afforded for applying and removing the bushings.

In the operation of the tool, the cross head 11 is bolted onto the engine structure as shown in Fig. 1 and the shaft 7 with the plug 5 thereon is inserted into the bushing to be removed until the shoulder 18 strikes the outer end of the bushing so as to dispose the locking pins 19 in the plane of the oil openings 20 in the bushing when the plug is mounted on the shaft 7, the aforesaid extension of the plug into the bushing may be effected by manipulation the drive nut 14 to axially move the shaft 7 and plug. At this time the shaft 7 is adjusted so as to lie short of a position in the plug at which the locking pins 19 will be urged thereby into locking position. If at the time the plug 5 is inserted into the bushing as aforesaid, the pins 19 register with the oil openings 20 in the bushing, or when the plug is turned to so register said pins and openings, the operator may cause the pins to be extended into said openings by manually turning the shaft and advancing the end thereof in the bore 28 to press against the spring 29 or the thrust pin 25 as the case may be, and thereby move the thrust pin so that its conical end pressing against the similar ends of the locking pins will extend said locking pins into the openings 20 and thereby lock the plug to the bushing as shown in Fig. 1. If the shaft 7 is turned so as to compress the spring 29 while the pins 19 are out of registry with the openings 20, as shown in Fig. 4, it is apparent that said spring will cause the pins to be extended into locking position when the plug is turned to align said pins with the oil openings. This turning of the plug is effected by manual rotation of the shaft 7 as aforesaid when the plug is locked to the bushing the operator turns the handle 16 and thereby axially moves the shaft, plug and bushing for withdrawing the bushing. It should be noted that the removal of the bushing may be effected with a pulling or pushing action dependent on the location of the bushing and the operation desired to best effect the removal of the bushing.

It is now seen that the tool hereof may also be effectively employed for installing a bushing, in which case the plug is mounted in and locked to the bushing to be installed, following which the nut drive means is operated through manipulation of the handle 16, to axially move the shaft, plug 5 and bushing thereon so that the bushing will be fitted into the bore therefore in the engine structure or block. As in removing the bushing, the installation operation can be effected with a pushing or a pulling action. Circumferential adjustments are effected by rotating the shaft as in removing the bushing.

It is important to note that my improved tool will positively lock the plug and bushing so that not only is the operation of removing and installing a bushing greatly facilitated and rendered more precise and accurate, but all damage to the parts is eliminated and a great saving in time and labor is effected. The resilient action of the pin which engages the bushing has the effect of preventing the scoring of finished surface of a new bushing during its installation.

While I have shown and described a specific embodiment of my invention I do not limit myself to the exact details of construction set forth, and the invention embraces such changes, modifications and equivalents of the parts and their formation and arrangement as come within the purview of the appended claims.

I claim:

1. A bushing tool comprising, a plug adapted to be inserted into a bushing in which an oil opening is provided said plug having a radial bore, a locking pin slidable in said radial bore for extension into said oil opening, a stop shoulder on said locking pin for limiting the extension thereof into the oil opening of the bushing so that it will not pass entirely through the opening and project from the opposite side of the bushing, said plug having a second bore, part of which is screw threaded said second bore intersecting said radial bore, a thrust pin slidable in said second bore and engageable with said locking pin, said pins having co-operating cam faces for effecting extension of the locking pin responsive to the sliding movement of said thrust pin, a shaft threaded in said bore and constituting a support for said plug, and a compressible spring interposed between said shaft and thrust pin for actuating said thrust pin responsive to movement of said shaft as it is screwed into said bore.

2. A bushing tool comprising, a plug adapted to be inserted into a bushing in which an oil opening is provided said plug having a radial bore, a locking pin slidable in said radial bore for extension into said oil opening, a stop shoulder on said locking pin for limiting the extension thereof into the oil opening of the bushing so that it will not pass entirely through the opening and project from the opposite side of the bushing, said plug having a second bore, part of which is screw threaded said second bore intersecting said radial bore, a thrust pin slidable in said second bore and engageable with said locking pin, said pins having co-operating cam faces for effecting extension of the locking pin responsive to the sliding movement of said thrust pin, a shaft threaded in said bore and constituting a support for said plug, a cross head through which said shaft extends, means for mounting said cross head on the structure in which the bushing is installed, and operating means on said cross head for axially moving said shaft to pull or push the bushing held on said plug.

3. A bushing tool comprising, a plug adapted to be inserted into a bushing in which oil openings are provided said plug having a radial bore, locking pins slidable in said radial bore for extension into said oil openings, a stop shoulder on said locking pin limiting the extension thereof into the oil openings of the bushing, said plug having a second bore into a part of which said pins extend and another part of which is screw threaded said second bore intersecting said radial bore, a thrust pin slidable in said second bore and engageable with said locking pins, said pins having co-operating cam faces for effecting extension of the locking pins responsive to the sliding movement of said thrust pin, a shaft threaded in said bore and constituting a support for said plug, a cross head through which said shaft extends, means for mounting said cross head on the structure in which the bushing is installed, and operating means on said cross head for axially moving said shaft, said mounting means and said operating means being so constructed that said operating means can be actuated or said shaft rotated as desired.

4. In a bushing tool, a plug adapted to be inserted into a bushing, a locking pin carried by said plug, said plug having a screw threaded opening therein, a screw shaft threaded into said opening for supporting the plug, means in the plug responsive to axial movement of the shaft when it is screwed into said opening for engaging and extending said locking pin into locking engagement with the bushing, means mounting said shaft for rotational and axial movement on the structure in which a bushing is installed, a drive nut freely rotatably supported on said mounting means and threaded on said shaft, and a rotative means on said mounting means for turning said nut relatively to said shaft to move the same longitudinally, said shaft being manually rotatable due to the free rotation of said nut and said rotative means, for effecting the operation of the locking means and also turning the plug.

CHARLES E. JOHNSON, Jr.